Oct. 21, 1958     J. E. HECKETHORN     2,857,490

AUTOMATIC SWITCHES RESPONSIVE TO SPEED VARIATIONS

Filed May 20, 1957

INVENTOR.
John E. Heckethorn

BY

*[signature]*

ATTORNEY

United States Patent Office 2,857,490
Patented Oct. 21, 1958

2,857,490

AUTOMATIC SWITCHES RESPONSIVE TO SPEED VARIATIONS

John E. Heckethorn, Denver, Colo., assignor to Heckethorn Manufacturing & Supply Co., Littleton, Colo., a corporation of Colorado Application May 20, 1957, Serial No. 660,413

3 Claims. (Cl. 200—80)

This invention relates to a device for controlling electric circuits in response to variations in speed of a rotating element, and is more particularly designed as an improvement over the structure illustrated and described in applicant's co-pending application, Serial No. 614,644, now abandoned. The device is particularly intended as an "inhibitor switch" for use on the automatic transmissions of automotive vehicles to electrically prevent accidental actuation of the "reverse" control while the vehicle is moving forwardly at a rate of speed which might be damaging to the transmission. It is, however, not limited to this particular use but will be found valuable wherever it is desired to open or close an electric circuit in response to variation in speed of a rotating element.

The principal object of the invention is to provide an inhibitor switch which will function to provide instantaneous circuit-opening and circuit-closing functions at accurate preset speeds so as to avoid arcing at the contact and fluttering of the contacts as the critical speed is approached or departed from.

In prior devices of this nature, difficulties were encountered in some instances due to the use of a rotating permanent magnet. The constant transposition of the magnetic poles due to the rotation of the magnet created a vibrating or fluttering effect on the contact-closing mechanism at relatively low speeds which interfered with efficient functioning of the device. Another object of this invention is to substitute a stationary magnet for the usual rotating magnet to eliminate the fluttering or vibration of the circuit-closing mechanism at low speeds.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 1:
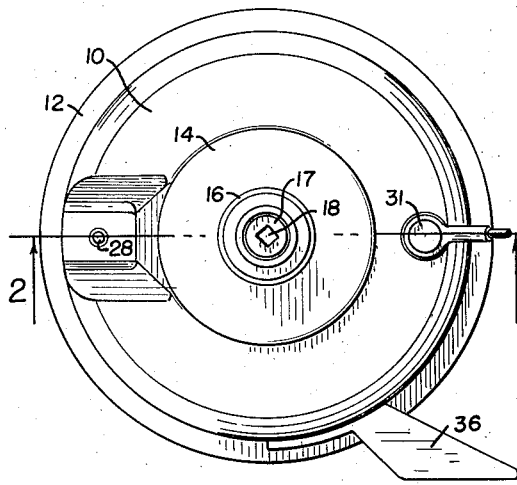
Fig. 1 is a top view of the improved inhibitor switch.

The improved inhibitor switch is housed in an inverted cup-shaped housing 10, the bottom of which is closed by means of a bottom plate 11 pressed into the housing 10. The bottom plate may be permanently secured in place, if desired, by spot welding it to a flange 12 formed on the housing. The housing 10 may be provided with suitable brackets, such as shown at 36, whereby it may be mounted on any convenient part of an automotive vehicle.

The top of the housing 10 and the bottom plate 11 are indented to form seats for ball-type, self-aligning bearing 13. The bearings 13 are retained in place in their seats by means of cup-shaped bearing caps 14 which are mounted on and secured to the top of the housing 10 and the bottom plate 11 in any desired manner. One method of attaching the bearing caps to the device would be to form them from die-castings provided with lugs 37 which extend through suitable receiving openings in the top of the housing 10 and in the bottom plate 11, where they are upset or riveted in place.

The caps 14 retain lubrication wicking 15 about the bearings 13 and each is provided with a concentric threaded nipple 16 for receiving the coupling of a conventional flexible speedometer shaft tube. A governor shaft 17 is journalled in and extends vertically between the bearings 13. The extremities of the governor shaft 17 are provided with suitable sockets 18 for receiving the extremities of a conventional flexible speedometer shaft.

A rotor 19 is fixedly mounted on the shaft 17 within the housing 10. The rotor is provided with upturned side edges which form oppositely positioned bearing brackets 20. A weight arm shaft 21 is journalled in each bearing bracket 20, and an inverted L-shaped weight arm 22 extends over and is fixedly mounted or formed on each of the weight arms 22. The lower extremity of each weight arm is fixedly embedded in a swinging weight 23, and the upper portion of each weight arm, indicated at 24, extends inwardly toward the axis of the shaft 17 and terminates in a circumferential groove 25 formed in and about a slider 26.

The slider 26 slidably and rotatably surrounds the shaft 17 and is supported thereon by means of the upper portions 24 of the weight arms 22. The slider 26 may be formed completely of iron, steel, or other magnetically-attractable material, or it may be provided with a non-magnetic bushing 35 to separate the magnetic material from the shaft 17, depending upon the characteristics desired from the device.

Thus, it can be seen that outward and inward movements of the weights 23 are communicated through the weight arms 22 to the slider to move the latter downwardly and upwardly, respectively, on the shaft 17. The inward movement of the weight arms 22 is limited by their contacting the extremities of the rotor 19.

A resilient switch blade 27 is riveted or otherwise secured, as shown at 28, at one of its extremities to the inside of the top of the housing 10. The switch blade 27 is provided with an enlarged apertured medial portion 29 which completely surrounds the shaft 17 in spaced relation thereto. From the medial portion 29 the switch blade extends radially outward, terminating in a contact button 30. The contact button 30 is positioned below, and in position to contact a contact 31 extending through the top of the housing 10. The contact 31 is insulated from the housing by means of suitable electrical insulation 32.

The natural resiliency of the switch blade 27 tends to constantly urge the contact button 30 upwardly into electrical contact with the contact 31. The contact button 30 is drawn away from the contact 31 to open the circuit by means of a substantially circular, permanent magnet 33 which is secured to and below the round medial portion 29 of the switch blade 27 in any desired manner.

Figure 2:
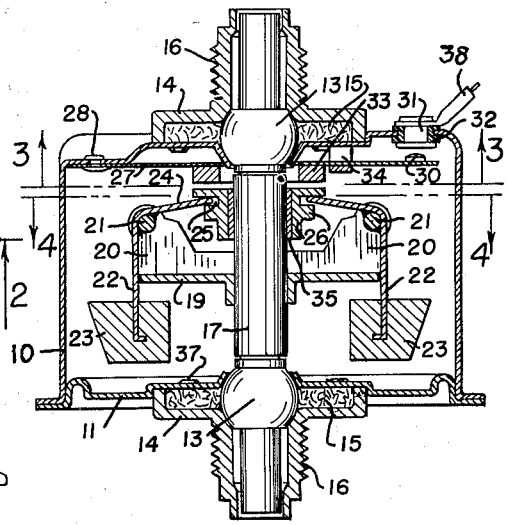
Fig. 2 is a vertical cross-section therethrough, taken on the line 2—2, Fig. 1.
Figure 3:
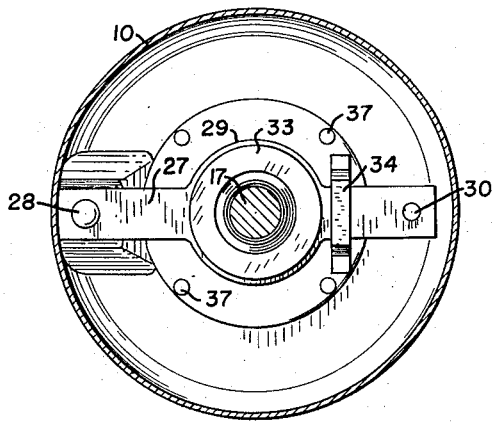
Fig. 3 is a horizontal section looking upwardly on the line 3—3, Fig. 2.
Figure 4:
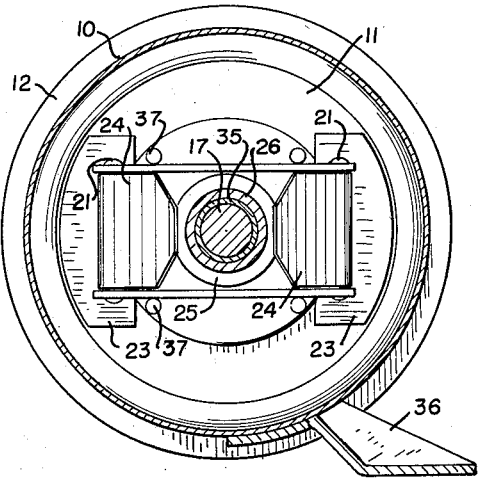
Fig. 4 is a similar section looking downwardly on the line 4—4, Fig. 2.

The magnet 33 tends to attract itself toward the slider 26, and in so doing flexes the switch blade 27 downwardly so as to separate the contacts 30 and 31, as shown in Fig. 2. The downward movement of the switch blade is stopped at a preset point by means of a stop 34 which is secured to the top of the housing and extends beneath the switch blade 27.

When at rest, the elements of the device are in the position shown in Fig. 2, with the contact button 30 separated from the contact 31. It can be seen that if the governor shaft 17 be rotated, centrifugal force will tend to swing the weights 23 outwardly proportionately to the speed of rotation of the shaft. The outward movement of the weights will be translated into downward movement of the slider by the L-shaped weight arms 22—24. Thus, as the speed increases, the slider will move downwardly, increasing the air gap between the magnet 33 and the slider 26. Eventually a point will be reached where the magnetic attraction between the magnet 33 and the slider 26 will be insufficient to span the air gap and overcome the resiliency of the blade 27. At this time the blade 27 will snap upwardly to bring the contact button 30 into contact with the contact 31 to close an electrical control circuit.

Now let us assume the speed of the shaft 17 gradually decreases. The weights 23 will tend to approach the axis of the shaft 17 and the slider 26 will gradually rise and approach the magnet 33. Eventually a point will be reached when the magnetic attraction will overcome the resiliency of the blade 27, causing the blade to snap downwardly against the stop 34 to instantly open the circuit between the contact button 30 and the contact 31, as shown in Fig. 2.

As illustrated, the housing 10 is electrically grounded, and a ground wire 38 of an electric circuit is connected to the insulated contact 31 so that a ground is closed when a predetermined speed is reached. By placing a second contact below the button 30, as shown in applicant's prior application, the device could be used to close an electric circuit when the speed has decreased to a predetermined point.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A centrifugally-actuated switch comprising an inverted cup-shaped housing, a bottom plate closing the lower end of the housing, a governor shaft disposed coaxially of said housing and being rotatably supported in the top wall of the housing and said bottom plate, a contact member extending through the top wall of said housing, a resilient switch blade disposed in said housing and adjacent said top wall in generally parallel relation thereto and having one end thereof secured to the top wall, a contact member on the opposite free end of said blade in opposing relation to said first contact member, said blade being resiliently urged toward said top wall with said contact members in engagement, said switch blade having a central opening therein, through which said governor shaft extends, a circular permanent magnet supported by the lower face of said switch blade in surrounding relation to said governor shaft, means limiting the downward movement of said blade, a slider freely surrounding said governor shaft and being of magnetically-attractable material, said slider being normally disposed adjacent said magnet, whereby the magnetic attraction therebetween overcomes the normal resilient urge of said switch blade with a resulting separation of said contact members, and centrifugally operated means supported by said governor shaft and operatively engaged with said slider, whereby upon a predetermined speed rotation of said governor shaft said slider will be moved away from said magnet until the magnetic attraction between the same is of less force than the upward yieldable urge of said blade with a resulting engagement of said contact members.

2. A centrifugally-actuated switch according to claim 1, wherein said governor shaft is provided with a ball-type self-aligning bearing adjacent said top wall and said bottom plate, said top wall and said bottom plate each being indented to form a ball seat for a respective bearing, a bearing cap supported by said top wall and said bottom plate in surrounding relation to said ball bearings, and wicking material disposed within said bearing caps in contacting relation to said bearings.

3. A centrifugally-actuated switch according to claim 1, wherein said centrifugally operated means comprises a rotor disposed concentrically of said governor shaft and being fixed thereto, a pair of diametrically opposed L-shaped arms pivotally supported by said rotor, the corresponding end portions of said arms being engaged with said slider, the opposite ends of said arms extending below said rotor, and a weight supported by the lower free end of each arm.

References Cited in the file of this patent

UNITED STATES PATENTS

| | | |
|---|---|---|
| Re. 21,038 | Leins | Mar. 28, 1939 |
| 2,544,791 | Hunt | Mar. 13, 1951 |
| 2,621,267 | Cripe | Dec. 9, 1952 |